United States Patent Office 3,178,710
Patented Apr. 13, 1965

3,178,710
MISS-DISTANCE INDICATOR
Milton H. Ammon, Northridge, Calif., assignor to The Bendix Corporation, North Hollywood, Calif., a corporation of Delaware
Filed Aug. 15, 1962, Ser. No. 217,187
2 Claims. (Cl. 343—12)

This invention relates to echo distance-measuring systems for measuring the distance by which a missile misses a target at which it is directed. Such an apparatus, commonly referred to as a miss-distance indicator, is located on or at the target and bounces a traveling wave off a missile as the latter moves past the target.

An object of the invention is to provide a miss-distance indicator that is simple, reliable, compact, light and relatively inexpensive. The last characteristic is important because when the target is hit, both it and the miss-distance indicator are usually consumed or expended.

Briefly, the present invention comprises a pulse transmitter at the target that continuously radiates pulses of wave energy into the surrounding space, and a receiver at the target that is gated "on" to received signals only for a very short period at the dying end of each transmitted pulse. In the absence of a missile within a predetermined distance (defined as the range cut-off sphere), the receiver receives only a small, constant amount of leakage energy from the transmitter during each "open-gate" period, and the output of the receiver integrated over a period longer than the pulse repetition period is constant. When a missile enters the range cut-off sphere, echoes bounced off it are received with the leakage energy and either increase or diminish the receiver output, depending on whether the wave energy of the echo pulse is in phase or out of phase with the leakage energy. The phase of the echo pulse energy reverses with respect to the leakage energy in response to every half wavelength of radial movement of the missile with respect to the target. By choosing the wavelength of the wave energy short relative to the radius of the range cut-off sphere, many phase reversals can be made to occur in response to any substantial interception of the range cut-off sphere by a missile, and the number of such reversals is a measure of the depth of interception. The successive, gradual phase reversals produce long (as compared to the transmitter pulse repetition rate) pulses in the output of the receiver that can readily be counted.

A full understanding of the invention may be had from the detailed description to follow with reference to the drawing, in which.

Figure 1:
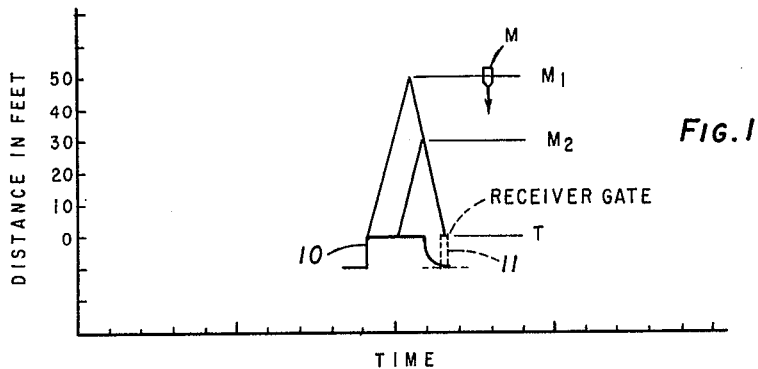
FIG. 1 is a graph showing the relation between the transmitting and receiving periods of the present invention and echoes from missiles at different distances.

Referring first to FIG. 1, assume a target carrying radar equipment located at a zero distance base line T and a missile M moving toward the target. Assume further that the radar equipment on the target transmits pulses 10 of higher frequency energy at regular intervals and is capable of receiving echoes only during a short "open-gate" period 11 following the main body of, but in overlapping relation with the trailing edge of, the transmitted pulse 10, so that echoes received during the open-gate period are combined with the trailing edge of the transmitted signal. When the missile is at distance $M_1$, the echo from the first or leading edge of the transmitted signal 10 is received just before the trailing edge of the receiving gate period 11. At all greater distances, no echoes are received because they arrive after the gate period. At lesser distances, such as $M_2$, echoes are received.

Figure 2:
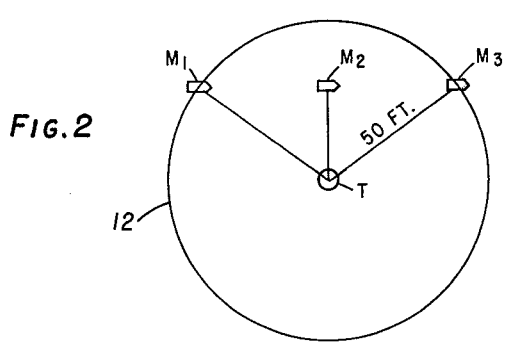
FIG. 2 is a diagram illustrating the path of a missile through the range cut-off sphere.

The distance $M_1$ constitutes the radius of a range cut-off sphere 12 centered on the target, as shown in FIG. 2. In the example shown, this radius is 50 feet.

Referring to FIG. 2, when the missile at point $M_1$ enters the 50-foot radius cut-off sphere, the echo period is roughly 0.1 microseconds, whereas, at the point $M_2$ of closest approach of the target T the echo period has been reduced to a lesser value of, for example, 0.06 microsecond.

Assume the following approximate values:

Transmitting frequency __megacycles per second__ 4,300
Wavelength _____foot__ 0.25
Pulse repetition time _____microseconds__ 10
Pulse duration _____do____ 0.04
Cycles per pulse _____ 40
Missile velocity _____feet per second__ 1,000
Missile travel between pulses _____inch__ 0.1

Since the wavelength is 0.25 foot, during each 0.125-foot increment of travel of the missile radially toward or away from the target, the echo wave undergoes a phase shift relative to the transmitted wave of one complete cycle, or 360°. If the trasmitted and reflected (echo) waves are combined, the resultant wave will pulse in amplitude in response to each 0.125-foot increment of radial movement of the missile. In the example taken, during travel of the missile from point $M_1$ to point $M_2$ the change in distance between the missile and the target is from 50 feet to 30 feet, or 20 feet. The increment, 0.125 foot, is divisible into 20 160 times, so that during travel of the missile from position $M_1$ to position $M_2$, the resultant wave of the transmitted wave and its echo pulses 160 times, and during the entire travel of the missile through the range cut-off sphere from the point of entry $M_1$ to the point of exit $M_3$, the resultant wave pulses 320 times.

Since the length of the missile path within the sphere increases as it is shifted from tangency to the sphere to intersection with the center of the sphere, the number of pulses in the resultant wave increases as the miss distance decreases and constitutes a measure of the miss distance. The pulses can be counted or can cause a count circuit to charge a capacitor in discrete steps to a voltage proportional to the number of pulses. Either the pulses or the voltage indicative of the number of pulses can be telemetered from the target to a remote point when the target is movable, such as a drone airplane or a land or water vehicle.

As the missile is approaching the center of the range sphere (the path from $M_1$ to $M_2$ in FIG. 2), there is a slight increase in frequency of the received echo due to Doppler effect. However, this is canceled by a corresponding slight decrease in frequency as the missile recedes from the center of the range sphere (the portion of the path from point $M_2$ to point $M_3$ in FIG. 2). Therefore the Doppler effect cancels out and can be ignored.

The accuracy of the system is determined in the main by the rise time of the transmitted pulse 10 in FIG. 1. FIG. 1 shows the ideal vertical rise which is, of course, never obtained in practice. When the pulse does not rise vertically, the time when the echo of the leading edge of the transmitted pulse reaches the receiver with sufficient strength to actuate it will vary with the distance and with the reflection coefficient of the missile, making the *effective* length of the transmitted pulse a variable. It is therefore desirable to have as fast a turn-on of the transmitter as possible.

Figure 3:
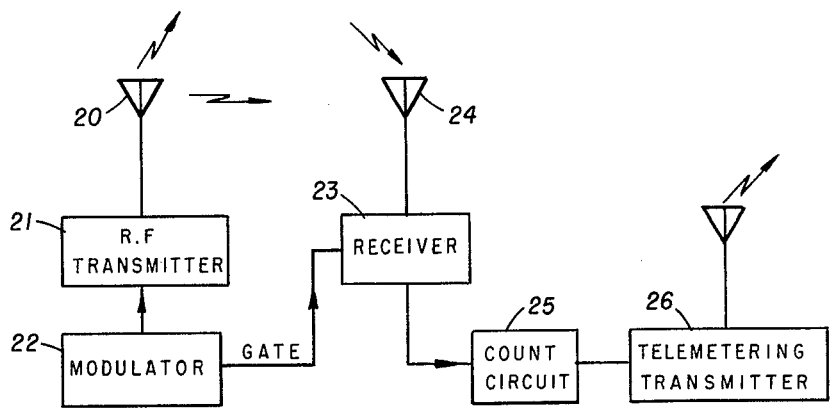
FIG. 3 is a schematic diagram of a circuit that may be employed in practicing the invention.

Referring now to the schematic diagram of FIG. 3, a simple system in accordance with the invention may incorporate a transmitting antenna 20 fed by a radio frequency transmitter 21 which is pulsed by a modulator 22 to periodically transmit RF pulses of constant duration. The modulator 22 also delivers gate pulses to a receiver 23 connected to a receiving antenna 24 for sensitizing the receiver and enabling it to receive signals induced in the receiving antenna only during the brief gating period 11 (FIG. 1) immediately following the main body of the transmitted pulse 10. In the absence of echoes from a missile or other body the receiver 23 will receive only the pulses of RF leakage energy from the transmitting antenna 20 to the receiving antenna 24, and the output of the receiver will be direct current pulses of a constant amplitude incapable of actuating the count circuit 25 to which they are applied. However, when a missile approaches within fifty feet of the apparatus, the amplitude of the D.C. pulses will increase and decrease, producing low frequency (relative to the pulse repetition rate) pulses that actuate the count circuit 25 to generate a potential proportional to the number of the low-frequency pulses received. It is desirable that the pulse repetition rate be fast enough, relative to the speed of the missile, to produce from five to ten pulses during travel of the missile a distance equal to a half wavelength of the RF wave. The potential generated by the count circuit 25 may be transmitted to a distant point by a telemetering transmitter 26 using any known telemetering techniques. Alternatively, the pulses (which are in the form of a sine wave) in the output of the receiver 23 may be telemetered to the distant point, and there counted.

Various known circuits may be employed in the blocks 21, 22, 23 and 24. As examples: the transmitter 21 may use the circuit shown in volume 7, page 173, of the Radiation Laboratory Series, published by McGraw-Hill Book Company; the receiver 23 may be that shown on page 576 of volume 23 of the above series; the count circuit 25 may be that shown on page 615 of volume 19 of the above series; and the modulator 22 may be that shown on page 9 in TR-615, "A Miniature High Resolution Pulse Radar," by Clyde D. Hardin and James Solerno, Diamond Advance Fuze Laboratory, Washington, D.C.

Although for the purposes of explaining the invention a particular embodiment thereof has been shown and described, obvious modifications will occur to a person skilled in the art, and I do not desire to be limited to the exact details shown and described.

I claim:

1. A communication system for indicating the miss distance between a target and a missile in flight comprising echo-ranging means at said target including:

transmitting means for transmitting waves in uniformly separated pulses of fixed duration;

receiving means including gating means synchronized with said pulses for rendering said receiving means responsive only during fixed receiving periods overlapping the trailing end of each transmitted pulse, whereby a portion of each transmitted pulse is directly received and detected to produce a constant receiver output signal in the absence of echo signals during said receiving periods, and whereby received echo signals from a missile approaching or receding from said target vary the amplitude of said receiver output up and down in synchronism with phase reversals of said received echo signals;

and means for indicating the number of pulses in said receiver output.

2. Apparatus according to claim 1 in which the wavelength of said transmitted waves is a small fraction of the maximum distance between said target and missile at which an echo reaches said receiving means during said receiving period, whereby each phase reversal in said echo represents a small increment of said maximum distance.

No references cited.

CHESTER L. JUSTUS, *Primary Examiner.*